(12) United States Patent
Suzuki et al.

(10) Patent No.: US 6,508,008 B2
(45) Date of Patent: Jan. 21, 2003

(54) RUNNING TYPE ROAD SURFACE SHAPE MEASURING APPARATUS

(75) Inventors: Kouichi Suzuki, Tokyo (JP); Yoshikazu Inoue, Tokyo (JP)

(73) Assignee: Sun Top Techno Co., Ltd., Tokyo (JP)

( * ) Notice: Subject to any disclaimer, the term of this patent is extended or adjusted under 35 U.S.C. 154(b) by 5 days.

(21) Appl. No.: 09/793,691

(22) Filed: Feb. 26, 2001

(65) Prior Publication Data

US 2002/0073566 A1 Jun. 20, 2002

(30) Foreign Application Priority Data

Dec. 20, 2000 (JP) ....................................... 2000-386961

(51) Int. Cl.[7] .............................................. E01C 23/01
(52) U.S. Cl. ........................................... 33/521; 33/523
(58) Field of Search .......................... 33/521, 523, 1 H, 33/775; 73/146

(56) References Cited

U.S. PATENT DOCUMENTS

| | | | | |
|---|---|---|---|---|
| 1,444,108 A | * | 2/1923 | Carr ............................. | 404/83 |
| 2,344,216 A | * | 3/1944 | Raydon ........................ | 33/523 |
| 3,026,164 A | * | 3/1962 | Lancerini ..................... | 346/8 |
| 3,056,209 A | * | 10/1962 | Oliver ......................... | 33/523 |
| 3,136,070 A | * | 6/1964 | Keen et al. .................. | 33/523 |
| 4,137,638 A | * | 2/1979 | Watts .......................... | 33/701 |
| 4,158,258 A | * | 6/1979 | McKechnie ................... | 33/521 |
| 4,403,419 A | * | 9/1983 | Graves ........................ | 33/523 |
| 4,788,773 A | * | 12/1988 | Palsgard et al. .............. | 33/333 |
| 4,821,426 A | * | 4/1989 | Angove ........................ | 33/523 |
| 5,107,598 A | * | 4/1992 | Woznow et al. .............. | 33/521 |
| 5,255,561 A | * | 10/1993 | Fleming et al. .............. | 73/146 |
| 5,535,143 A | * | 7/1996 | Face ........................... | 702/165 |
| 6,035,542 A | * | 3/2000 | Woznow et al. .............. | 33/533 |

* cited by examiner

Primary Examiner—Diego Gutierrez
Assistant Examiner—R. Alexander Smith
(74) Attorney, Agent, or Firm—Rodman & Rodman

(57) ABSTRACT

A running type road surface shape measuring apparatus for measuring the unevenness and grade of road surface in the longitudinal and transverse directions during running of vehicle comprises a vehicle body (1), on which two running wheels (3, 5) and one measuring wheel (6) are supported rotatably in series, said measuring wheels (6) is located movably in the upward and downward direction between said two running wheels (3, 5), and an ancillary wheel (8) is rotatably mounted on said body (1) in parallel to said measuring wheel (6). The measuring wheel (6) is provided with a displacement measuring sensor (13) for measuring a displacement in upward and downward directions of said measuring wheel (6) and a distance measuring encoder (16) for measuring a moving distance of said measuring wheel (6), and said vehicle body (1) is provided with an angle measuring sensor (19) for measuring a grade of road surface.

2 Claims, 3 Drawing Sheets

RUNNING TYPE ROAD SURFACE SHAPE MEASURING APPARATUS

BACKGROUND OF THE INVENTION

1. Technical Field

This invention relates to a running type road surface shape measuring apparatus for measuring the shapes of a road surface during running.

2. Prior Art

In the known measuring apparatuses of this kind, there are various apparatuses such as evenness ruler, measuring apparatus for recording automatically longitudinal and transverse grades of road surface in profile-graph, measuring apparatus for recording automatically unevenness of road surface, double measuring apparatus for measuring continuously longitudinal grade and transverse grade in separation, measuring apparatus for measuring continuously longitudinal shape of road surface by carrying on large size vehicle, etc. and those measuring apparatuses are divided into such categories as for measuring evenness in longitudinal and transverse direction and as for measuring grade in longitudinal and transverse direction of road surface, depending on which purpose individual construction is taken into account.

Those conventional measuring apparatuses as described heretofore are unable to measure simultaneously both of the longitudinal and transverse unevenness and the longitudinal and transverse grade, and are provided respectively with variable measuring mechanisms for each measuring purpose. There further exist apparatuses of multi-measuring purpose, but they must be equipped with over-sized measuring apparatuses which make it difficult to adapt to a small scale road surface resulting in problems of inaccurate measured values.

SUMMARY OF INVENTION

It is an object of this invention to provide a running type road surface shape measuring apparatus which is made it possible to measure simultaneously both of the longitudinal and transverse unevenness and the longitudinal and transverse grade of the road surface, and which is made it possible to run for measuring on the road surface to be measured.

It is an another object of this invention to provide a running type road surface shape measuring apparatus which is made it possible to calculate the measured values of the road surface shape and to process the road surface shape so as to be graphed out by a computer.

The running type road surface shape measuring apparatus according to this invention comprises a vehicle body on which two running wheels and one measuring wheel are supported rotatably in series, said measuring wheel is located movably in the upward and downward directions between said two running wheels, an ancillary wheel is rotatably mounted on the outside of said vehicle body in parallel to said measuring wheel, said measuring wheel is provided with a displacement measuring sensor for measuring a displacement in upward and downward direction of said measuring wheel and a distance measuring encoder for measuring a moving distance of said measuring wheel, and said vehicle body is provided with an angle measuring sensor for measuring a grade of road surface.

In the running type road surface shape measuring apparatus according to this invention, said displacement measuring sensor, distance measuring encoder and angle measuring sensor are connected through an analogue data converter unit to a data processor unit for calculating the measurement value for the road surface shape and for processing the road surface shape so as to be graphed out on the basis of the measured data.

DETAILED DESCRIPTION OF THE PREFERRED EMBODIMENT

Figure 1:
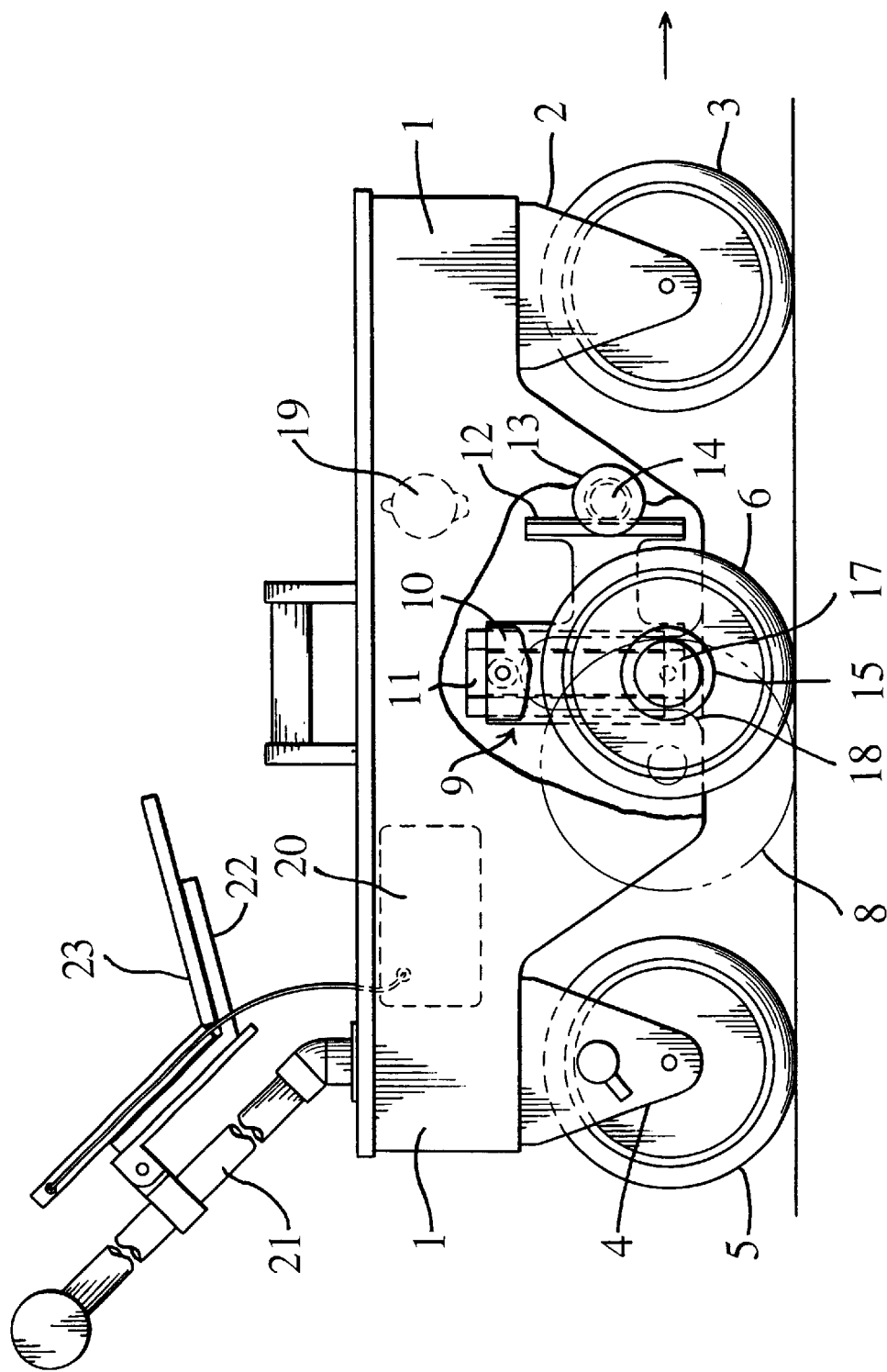
FIG. 1 is a side view of a running type road surface shape measuring apparatus according to this invention.

In a preferred embodiment of a running type road surface shape measuring apparatus according to this invention shown in FIG. 1, reference numeral 1 denotes a vehicle body having a length of less than 1 m, said vehicle body 1 has a running wheel 3 supported rotatably on a flange 2 in the forward direction thereof and another running wheel 5 supported rotatably on a flange 4 in the backward direction thereof. Further, said vehicle body 1 has a measuring wheel 6 supported rotatably between the front running wheel 3 and the rear running wheel 5, and the running wheel 3, running wheel 5 and measuring wheel 6 are located in series on said vehicle body 1.

The vehicle body 1 is provided at the side surface with a supporting shaft 7 extending perpendicularly to the longitudinal direction thereof, to which an ancillary wheel 8 is mounted rotatably. The ancillary wheel 8 is located outside of the vehicle body 1 adjacent the measuring wheel 6 and is spaced in parallel to said running wheels 3, 5 and measuring wheel 6 located in series.

As the running wheels 3, 5 are arranged in front and rear around the measuring wheel 6 and the ancillary wheel 8 is spaced sideways from the measuring wheel 6, the measuring wheel 6 can measure the shape of road surface in longitudinal direction in cooperation with the running wheels 3, 5 and can measure the shape of road surface in transverse direction in cooperation with the ancillary wheel 8.

The measuring wheel 6 is mounted rotatably to a supporting frame 9, which is provided with a guide member 10, said guide member 10 is engaged to a guiding rail 11 mounted in the inside of the vehicle body 1 in such manner that said supporting frame 9 can move upwardly and downwardly along said guiding rail 11, and thus, the measuring wheel 6 may move upwardly and downwardly together with the supporting frame 9 along the guiding rail 11. The distance that the measuring wheel 6 has moved upwardly and downwardly is to give the road surface shape, and the measuring wheel 6 is provided with a displacement measuring sensor for measuring the upward and downward displacement of the measuring wheel 6.

Figure 2:
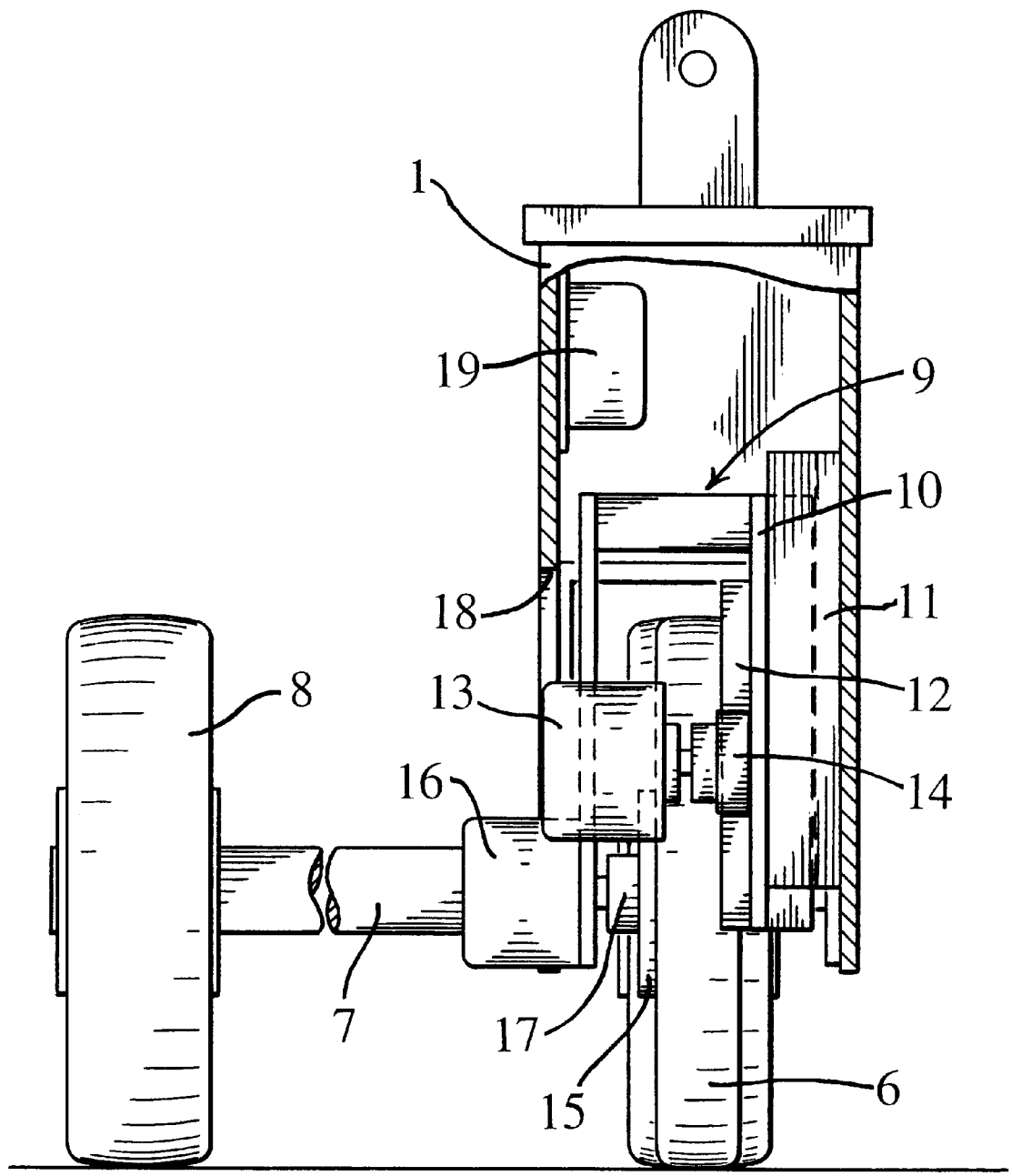
FIG. 2 is a vertical sectional view of FIG. 1.
Figure 3:
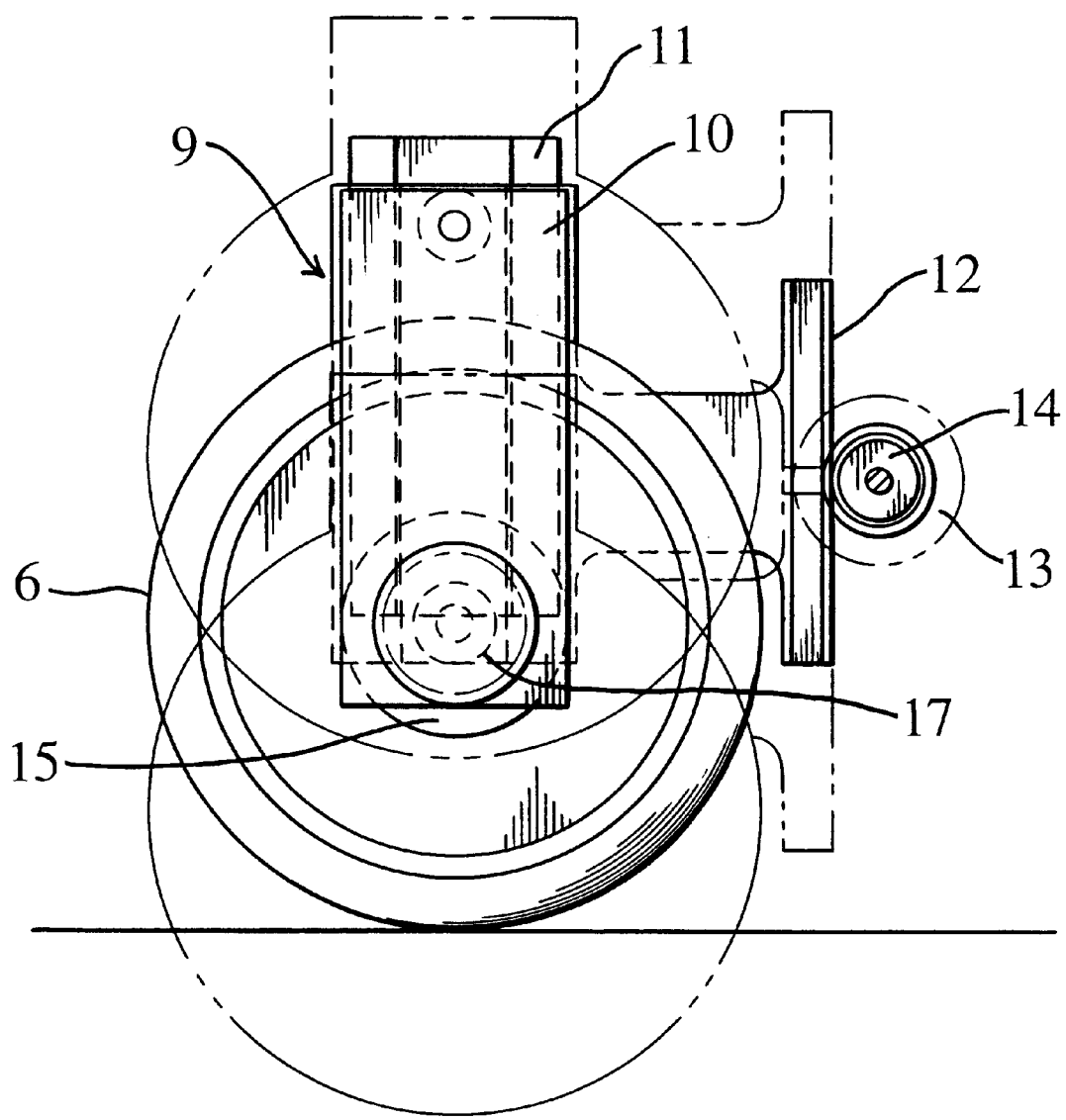
FIG. 3 is a side view of a measuring wheel showing an upward and downward movement of a measuring wheel.

The displacement measuring sensor in the preferred embodiment as shown in FIGS. 1-3 comprises a displacement measuring encoder 13, said displacement measuring encoder 13 is mounted to the vehicle body 1 and is provided with a displacement measuring element 14 in engagement with a measuring guide member 12 fixed to the supporting frame 9 for measuring the distance of the upward and downward displacement of the measuring wheel 6. The upward and downward displacement of the measuring wheel 6 is transmitted through the measuring guide member 12 of the supporting frame 9 from the measuring element 14 to the displacement measuring encoder 13. The displacement measuring sensor for measuring the upward and downward displacement of the measuring wheel 6 may be also consisted of a laser sensor, ultrasonic sensor or infrared radiation sensor, etc.

The measuring wheel 6 is provided at its rotating shaft with a measuring guide boss 15 which is engaged with a distance measuring element 17 of a distance measuring encoder 16 fixed on the supporting frame 9 for measuring a moved distance of the measuring wheel 6. The revolution number that the measuring wheel 6 is moved and rotated in the direction shown by arrow in FIG. 1 is to give the moved distance of the measuring wheel 6, and the moved distance of the measuring wheel 6 is transmitted through the measuring guide boss 15 from the distance measuring element 17 to the distance measuring encoder 16. The vehicle body 1 is provided with a guide groove 18 for guiding the vertical movement of the distance measuring encoder 16 fixed on the supporting frame 9, and said distance measuring encoder 16 may be fixed on the body 1 instead of fixing it on the supporting frame 9 for the measuring wheel 6.

The vehicle body 1 is provided with an angle measuring sensor 19 for measuring a grade of road surface from an angle for every 1 cm in the running direction. As the running wheel 3, measuring wheel 6 and running wheel 5 are arranged in series, and the ancillary wheel 8 is arranged in the side of three wheels 3, 5, 6, the angle measuring sensor 19 can measure a longitudinal grade of road surface by means of the running wheels 3, 5 and measuring wheel 6 arranged in series and can measure a transverse grade, of road surface by means of the ancillary wheel 8 in cooperation with the running wheels 3, 5 and measuring wheel 6 arranged in series.

Further, the vehicle body 1 is provided with an analog data converter unit 20 comprising a pulse converter and an analog-digital converter, and has a stationary table 22 mounted to a supporting rod 21 on its upper surface, and a data processor unit 23 of computers is arranged on the stationary table 22. The data processing unit 23 is connected with the analog converter unit 20, to which the displacement measuring encoder 13, distance measuring encoder 16 and angle measuring sensor 19 are connected respectively.

The displacement measuring encoder 13, distance measuring encoder 16 and angle measuring sensor 19 transmit their measured data to the data processor unit 23 through the analog converter unit 20.

The measurement of the moved distance is performed by calculating the data measured by the distance measuring encoder 16. The distance measuring encoder 16 transmits a signal of 2000 pulse per rotation. If it is presumed that the diameter of the measuring wheel 6 is 191 mm, the circumference of the measuring wheel 6 will be 191×π, and thus is approximately 600 mm. In other words, it means that it will transmit 2000 pulse signal to proceed 600 mm and that one pulse will be 0.3 mm. Therefore, if it is presumed that the measured data of 450,000 pulses arrives to the data processor unit 23, the distance proceeded in the running direction will be 450,000×0.3 and thus will be 135,000 mm (13 m and 50 cm).

The measurement of the road surface shape is performed by calculating the measured data of the displacement measuring encoder 13. The displacement measuring encoder 13 transmits 2000 pulse signal per one revolution as well as a distance measuring encoder 16. When it is rotated for 360 degrees of one revolution, 5.6 pulse signal for each one degree is transmitted. As the upward and downward displacement of the measuring wheel 6 is ±5 cm, a correction coefficient for measuring the road surface shape may be obtained from the angles of the encoder 13 where the measuring wheel 6 proceeds in the direction of +5 cm and the angle of the encoder 13 where the measuring wheel 6 proceeds in the direction of −5 cm. In other words, this means that the correction coefficient of its error can be obtained from the equations of tan. (actual angle where +5 cm proceeded)=50 mm and tan. (actual angle where −5 cm proceeded)=−50 mm.

On the basis of the angle of the encoder 13 and the correction coefficient, the road surface shape is measured. For example, if the measurement data of 2.8 pulses is arrived to the data processor unit 23, the road surface shape is obtained by the equation of tan. (0.5)×correction coefficient.

The measurement of grade of road surface can be obtained on the basis of the measurement data of the angle measuring sensor 19. In this case, the vehicle body 1 should be provided with a digital angle gauge at the starting point for measuring. The angle at this point becomes an initial angle. As the angle measuring sensor 19 transmits the angle for each 1 cm being proceeded, as measurement data, a grade will be obtained by an equation of sin. (angle for each 1 cm)+tan. (angle of the encoder 13)×correction coefficient.

As described hereinabove, the road surface shape can be measured by means of each encoder 13, 16, 19 per each distance that the measuring wheel 6 is proceeded, and the measurement data obtained from each encoder 13, 16, 19 can be transmitted to the data processor unit 23 through the analogue data converter unit 20, and can be recorded as real values into the data processor unit 23 on real time.

In the road surface shape measuring apparatus according to this invention, both of the unevenness and grade of the road surface in both of longitudinal and transverse directions can be measured accurately and reliably. As the construction is so compact and the measuring can be carried easily on small automobile, it need not make such traffic restriction as interruption and a congestion of traffic at the place where the various measuring are to be performed. Further, as it is possible to calculate the measured values of the road surface shape and to process the road surface shape so as to be graphed out by a computer, the accurately and reliably measured values can easily be obtained from the data processor unit on real time.

What is claimed is:

1. A running type road surface shape measuring apparatus comprising, a vehicle body having front and rear portions and a side portion, a front running wheel rotatably supported on the front portion of said vehicle body, a rear running wheel rotatably supported on the rear portion of said vehicle body and located in series with said front running wheel to define a longitudinal direction, a supporting frame provided on the vehicle body between the front and rear portions, said supporting frame supporting a non-pivotable vertically movable guide frame for movement in an upward and downward direction with respect to said vehicle body, a measuring wheel rotatably mounted to said guide frame such that vertical displacement of the measuring wheel moves the guide frame in the upward and downward directions with respect to the vehicle body, said measuring wheel being located between the front and rear running wheels in series with said front and rear running wheels, an ancillary wheel rotatably supported on a supporting shaft extending transversely of the side portion and perpendicular to the longitudinal direction of the vehicle body, said ancillary wheel being located outside the vehicle body adjacent to the measuring wheel and in parallel relationship with the measuring wheel, a displacement measuring sensor including a displacement measuring encoder mounted to the vehicle body, a measuring guide member attached to the guide frame and a displacement measuring element connected to the displacement measuring encoder and engaged with the displacement guide member for measuring vertical displacement of the measuring wheel, a distance measuring sensor including a distance measuring encoder attached to the supporting frame, a measuring guide boss attached to the measuring wheel, and a distance measuring element connected to the distance measuring encoder and engaged with the measuring guide boss for measuring the distance traveled by the vehicle body, and an angle measuring sensor attached to the vehicle body for measuring the grade of a road surface in the direction traveled by the vehicle body by means of the measuring wheel and running wheels being located in series, said angle measuring sensor measuring the grade of the road surface in the transverse direction by means of the parallel arrangement of the measuring wheel and the ancillary wheel.

2. A running type road surface shape measuring apparatus according to claim 1 wherein said displacement measuring encoder, said distance measuring encoder and said angle measuring sensor are connected through an analog data converter unit to a data processor unit.

\* \* \* \* \*